United States Patent
Ashwood-Smith

(10) Patent No.: US 9,054,827 B2
(45) Date of Patent: Jun. 9, 2015

(54) OPTICAL SWITCHING DEVICE USING SPECTRAL TRIGGER

(71) Applicant: Futurewei Technologies, Inc., Plano, TX (US)

(72) Inventor: Peter Ashwood-Smith, Gatineau (CA)

(73) Assignee: Futurewei Technologies, Inc., Plano, TX (US)

(*) Notice: Subject to any disclaimer, the term of this patent is extended or adjusted under 35 U.S.C. 154(b) by 176 days.

(21) Appl. No.: 13/648,593

(22) Filed: Oct. 10, 2012

(65) Prior Publication Data
US 2013/0195450 A1 Aug. 1, 2013

Related U.S. Application Data

(60) Provisional application No. 61/591,628, filed on Jan. 27, 2012, provisional application No. 61/591,441, filed on Jan. 27, 2012.

(51) Int. Cl.
*H04J 14/00* (2006.01)
*H04Q 11/00* (2006.01)
*H04J 14/02* (2006.01)

(52) U.S. Cl.
CPC ........ *H04J 14/0212* (2013.01); *H04Q 11/0005* (2013.01); *H04Q 11/0066* (2013.01); *H04Q 2011/0039* (2013.01); *H04Q 2011/0041* (2013.01); *H04J 14/0257* (2013.01); *H04J 14/0258* (2013.01)

(58) Field of Classification Search
CPC ............. H04J 14/0227; H04J 14/0284; H04Q 2011/0073; H04Q 11/0005; H04Q 11/0066; H04Q 2011/0016
USPC .......................................... 398/49, 48, 43, 47
See application file for complete search history.

(56) References Cited

U.S. PATENT DOCUMENTS

| 5,912,753 A * | 6/1999 | Cotter et al. .................... 398/54 |
| 6,014,236 A | 1/2000 | Flaherty |
| 6,163,393 A | 12/2000 | Wu et al. |

(Continued)

FOREIGN PATENT DOCUMENTS

| CN | 101056265 A | 10/2007 |
| CN | 101056420 A | 10/2007 |

(Continued)

OTHER PUBLICATIONS

Foreign Communication From a Counterpart Application, PCT Application No. PCT/CN2013/071034, International Search Report dated May 9, 2013, 7 pages.

(Continued)

*Primary Examiner* — Oommen Jacob
(74) *Attorney, Agent, or Firm* — Conley Rose, P.C.; Grant Rodolph; William H. Dietrich

(57) ABSTRACT

An apparatus comprising a processor, wherein the processor is configured to split an optical signal into a first optical signal and a second optical signal, wherein the first optical signal comprises a plurality of encoded wavelengths, receive a selection signal, wherein the selection signal selects a plurality of active wavelengths, wherein the active wavelengths are a subset of the encoded wavelengths, compute the routing information for the second optical signal using the active wavelengths, and switch the second optical signal using the routing information.

19 Claims, 8 Drawing Sheets

(56) References Cited

U.S. PATENT DOCUMENTS

| | | |
|---|---|---|
| 6,519,062 B1 | 2/2003 | Yoo |
| 6,657,757 B1 * | 12/2003 | Chang et al. .................... 398/49 |
| 6,819,870 B1 * | 11/2004 | Ge et al. .......................... 398/51 |
| 7,031,607 B1 | 4/2006 | Ashwood-Smith |
| 7,590,359 B2 * | 9/2009 | Kim et al. ..................... 398/186 |
| 2001/0040712 A1 * | 11/2001 | Cardakli et al. .............. 359/135 |
| 2002/0036813 A1 | 3/2002 | Roberts et al. |
| 2002/0126349 A1 | 9/2002 | Sarraf |
| 2002/0141017 A1 | 10/2002 | Chang et al. |
| 2003/0103252 A1 | 6/2003 | Liu et al. |
| 2003/0133641 A1 * | 7/2003 | Yoo ................................ 385/14 |
| 2004/0081463 A1 | 4/2004 | Kim et al. |
| 2004/0091198 A1 | 5/2004 | Graves |
| 2006/0147219 A1 | 7/2006 | Yoshino et al. |
| 2006/0159454 A1 | 7/2006 | Bjornstad |
| 2006/0171386 A1 * | 8/2006 | Hesse et al. ................... 370/389 |
| 2008/0285971 A1 * | 11/2008 | Liboiron-Ladouceur et al. ............ 398/45 |
| 2009/0169205 A1 * | 7/2009 | Bergman et al. ................ 398/45 |
| 2010/0221009 A1 | 9/2010 | Etemad et al. |
| 2013/0195447 A1 | 8/2013 | Ashwood-Smith |
| 2013/0195448 A1 * | 8/2013 | Ashwood-Smith et al. .... 398/38 |
| 2013/0195450 A1 * | 8/2013 | Ashwood-Smith ............ 398/49 |
| 2013/0251367 A1 | 9/2013 | Ishii et al. |

FOREIGN PATENT DOCUMENTS

| | | |
|---|---|---|
| CN | 101867435 A | 10/2010 |
| CN | 101877804 A | 11/2010 |
| WO | 2010072425 A1 | 7/2010 |

OTHER PUBLICATIONS

Foreign Communication From a Counterpart Application, PCT Application No. PCT/CN2013/071034, Written Opinion dated May 9, 2013, 4 pages.

Foreign Communication From a Counterpart Application, PCT Application No. PCT/CN2013/071048, International Search Report dated May 9, 2013, 6 pages.

Foreign Communication From a Counterpart Application, PCT Application No. PCT/CN2013/071048, Written Opinion dated May 9, 2013, 4 pages.

Ashwood-Smith, Peter, et al., "Spectral Encoding of an Optical Label or Destination," U.S. Appl. No. 13/648,589, filed Oct. 10, 2012.

Suzaki, Y., et al., "Hybrid Optoelectronic Router for Optical Packet Switching," 15th OptoElectronics and Communications Conference (OECC2010) Technical Digest, Sapporo Convention Center, 8D4-2 (Invited), Jul. 2010, pp. 538-539.

Office Action dated Aug. 13, 2014, 16 pages, U.S. Appl. No. 13/648,589, filed Oct. 10, 2012.

Office Action dated Feb. 2, 2015, 16 pages, U.S. Appl. No. 13/648,589, dated Oct. 10, 2012.

Office Action dated Jul. 29, 2014, 10 pages, U.S. Appl. No. 13/650,976, filed Oct. 12, 2012.

Office Action dated Dec. 30, 2014, 10 pages, U.S. Appl. No. 13/650,976, filed Oct. 12, 2012.

Office Action dated Mar. 24, 2015, 9 pages, U.S. Appl. No. 13/650,976, filed Oct. 12, 2012.

\* cited by examiner

OPTICAL SWITCHING DEVICE USING SPECTRAL TRIGGER

CROSS-REFERENCE TO RELATED APPLICATIONS

The present application claims priority to U.S. Provisional Patent Application No. 61/591,628 filed Jan. 27, 2012 by Peter Ashwood-Smith and entitled "Spectral Encoding of an Optical Label or Destination" and U.S. Provisional Patent Application No. 61/591,441 filed Jan. 27, 2012 by Peter Ashwood-Smith and entitled "Optical Switching Device Using Spectral Trigger," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical networks have become important in today's communication and data networks. Data is transferred using optical fibers, which are generally thinner, cheaper, and lighter than copper cables found in networks that operate in the electrical domain. Moreover, the capacity of optical fibers continues to increase at an extraordinary rate. Optical networks enable large amounts of data to be transferred through optical fibers at very high data rates and over very long distances. Transmission over an optical network may be implemented using a variety of network systems, such as Wavelength Division Multiplexing (WDM), Synchronous Optical Network (SONET)/Synchronous Digital Hierarchy (SDH), and optical packet networks. However, similar to other network technologies, optical networks have their shortcomings.

Despite having a superior medium, optical networks lack the technology to efficiently route and switch the massive amounts of optical data. Optical networks may comprise electrical, optical-electrical, or pure optical components. Unfortunately, development of pure optical components is still in the infancy stages, while electrical components and optical-electrical components are generally too slow to process the massive amounts of optical data. Furthermore, many optical networks require an optical-to-electrical conversion prior to processing the optical signal. The optical-to-electrical conversion transforms the optical signal into an electrical signal. Once in the electrical domain, electrical components, such as switches, routers, and regenerators, may be used to process the electrical signal. Subsequently, an electrical-to-optical converter transforms the electrical signal back into an optical signal. The conversion and electrical processing not only reduces an optical network's throughput, but also increases the complexity of the optical network.

One method to increase routing, switching, and processing speeds in optical networks is to efficiently process the header information encoded in the optical signal, such as a destination address or label. Efficiently processing the header information for an optical signal enables components in a network to execute faster routing or switching decisions. Current technology enables encoding a label or destination address using a single wavelength of light. However, because a transmitting laser operates within a finite range of wavelengths of light and at discrete values, the number of different destination addresses or labels is severely limited for an optical network. As a result, other technological alternatives are necessary to efficiently route optical signals through an optical network without electrical conversion.

SUMMARY

In one embodiment, an apparatus comprising a processor, wherein the processor is configured to split an optical signal into a first optical signal and a second optical signal, wherein the first optical signal comprises a plurality of encoded wavelengths, receive a selection signal, wherein the selection signal selects a plurality of active wavelengths, wherein the active wavelengths are a subset of the encoded wavelengths, compute the routing information for the second optical signal using the active wavelengths, and switch the second optical signal using the routing information.

In another embodiment, the disclosure includes an apparatus comprising a first single-stage component comprising a first output port and a second output port, a second single-stage component coupled to the first output port, and a third single-stage component coupled to the second output port, wherein the first single-stage component is configured to receive an optical signal comprising a plurality of encoded wavelengths, receive a first selection message from a selection logic unit, and switch the optical signal to one of the output ports using the encoded wavelengths and the first selection message, wherein the selection logic unit is configured to transmit a second selection message to the second single-stage component and to the third single-stage component.

In yet another embodiment, the disclosure includes a method comprising decoding a destination address encoded in an optical signal to a sequence of bits using spectrum analysis, partition the destination address into a plurality of segments, wherein each segment comprises one data value for a bit position in the destination address, wherein each segment has data values for different bit positions in the destination address, selecting a first segment, routing the optical signal in an optical network using a first segment, selecting a second segment, and routing the optical signal using a second segment after the optical signal has been routed using the first segment.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method to encode and decode an optical header, such as a destination address or label, within an optical signal. Wavelengths of light and polarization of light will be referenced as wavelengths and polarizations throughout the disclosure for conciseness purposes. Multiple wavelengths may be selected as a subset of available wavelengths in an optical network to encode the header information from an incoming electrical data signal. The selection process for the wavelengths may be based on a function of the header information, such as the destination address or label. Applying relative power levels and utilizing different polarizations may further increase the number of different destination addresses or labels that can be encoded beyond the range of tunable wavelengths of a laser transmitter. The incoming electrical data signal, including the header information, may be inversed multiplexed over the selected wavelengths and transmitted through the optical network. Another node within the optical network may receive the optical signal and perform a spectrum analysis (i.e., FT or equivalent spectral analysis) to produce power spectrum data. The power spectrum data may then be reversed mapped to obtain the header information initially encoded in the incoming electrical data signal. The header information may then be used to configure the switching behavior of downstream nodes in order to route the optical signal. The optical signal may be routed using a single-stage or multi-stage optical device. The multi-stage optical device may be constructed by stacking or cascading common single-stage optical components. Each single-stage optical component may route the optical signal based on a portion or subset of the header information by choosing to only act on a subset of the power spectrum information decoded.

Figure 1:
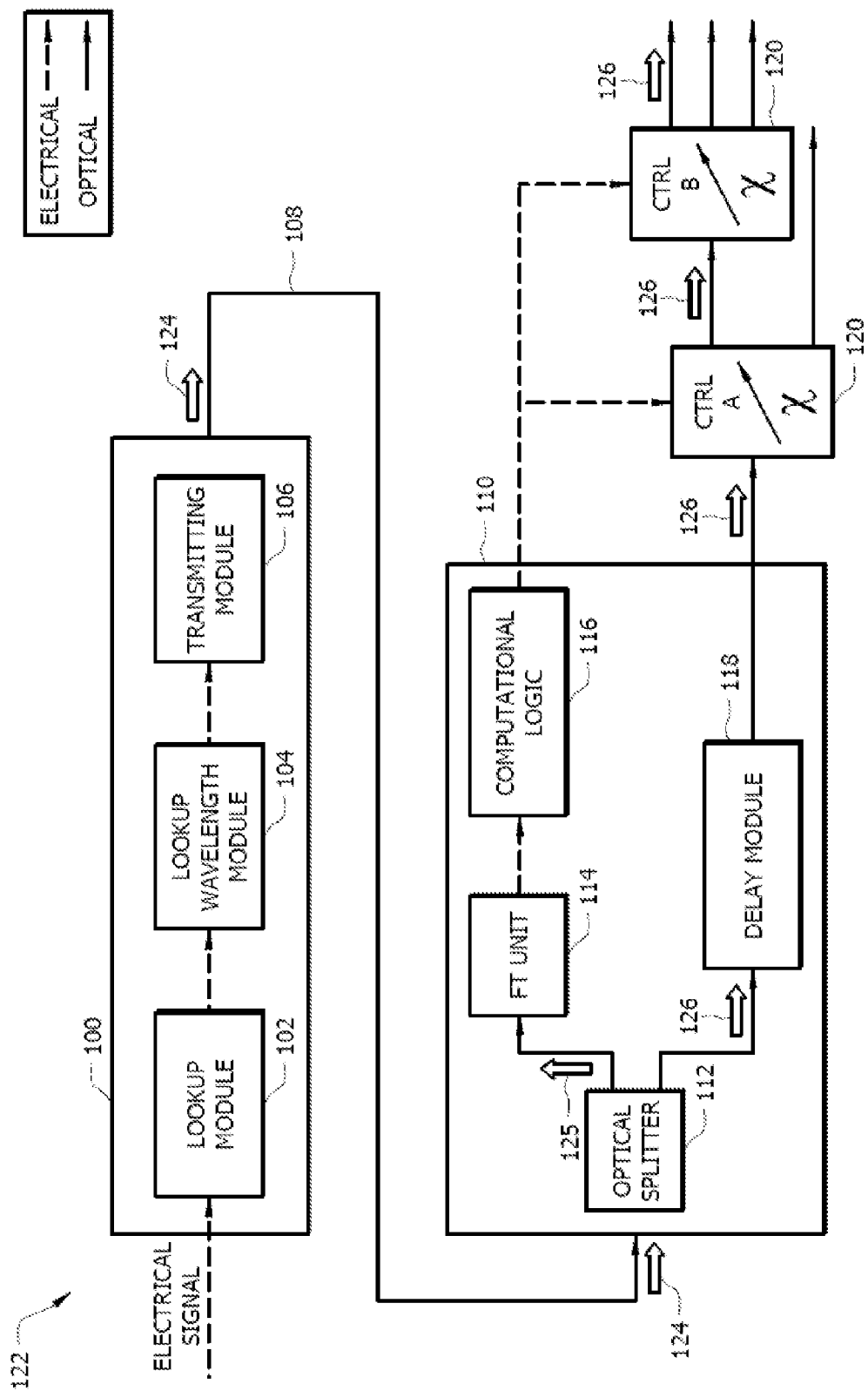
FIG. 1 is a schematic diagram of an embodiment of a framework configured to encode and decode the header information within an optical signal.

FIG. 1 is a schematic diagram of an embodiment of a framework that encodes and decodes the header information within an optical signal 124. Specifically, FIG. 1 illustrates node 100 encoding an electrical signal into an optical signal 124 and transmitting the optical signal 124 through optical network 122. Node 110 may extract the heading information from optical signal 124 to produce routing instructions to downstream nodes 120. Based on the routing instructions, the downstream nodes 120 may switch or route the optical signal 124 to the desired destination. The optical network 122 may be implemented using a variety of optical network systems that may include WDM and optical packet networks. The optical network 122 may comprise a plurality of nodes 100, 110, 120 interconnected using fiber optic links 108. The nodes 100, 110, 120 may be pure optical network devices or optical-electrical network devices. The network devices may be terminals, switches, or any other type of network devices that are able to receive, transmit, route, and process optical or electrical data signals. The fiber optic links 108 may be any type of connection used to transport optical signals 124, 126.

A node 100 may receive an incoming electrical data signal. The node 100 may functionally comprise a look up module 102, a lookup wavelength module 104, and a transmitting module 106. To implement the different modules 102, 104, and 106, node 100 may comprise a single network device or a plurality of interconnected electrical network devices (e.g., switches and routers), optical network devices, optical-electrical network devices, or any combination thereof. More specifically, node 100 may comprise electrical-to-optical converter devices, switching elements, add/drop nodes, optical transmitters and/or other network devices that permit converting an electrical signal to an optical signal 124 and subsequently transmitting the optical signal 124.

An incoming electrical data signal may comprise header information, such as a destination address or label. The header information may comprise a sequence of bits. The incoming electrical data signal may be any Open Systems Interconnection (OSI) layer 2 or layer 3 encoded data signal, such as an Ethernet frame or an Internet Protocol (IP) packet. The header information may be encoded as a sequence of bits in a variety of protocols, such as multi-protocol label switching (MPLS), Asynchronous Transfer Mode (ATM), Ethernet, Internet Protocol version 4 (IPv4), and Internet Protocol version 6 (IPv6). The header information may be a destination address encoded in an Ethernet frame, MPLS frame, IP packet or other similar types of data signals. The header information may be a label used in various protocols, such as a label in multi-protocol label switching (MPLS), data link connection identifier label (DLCI) in frame relay protocols, or a designated timeslot for time division multiplexing (TDM).

The lookup module 102 may be any device configured to determine the contents of the header information for the incoming electrical data signal. The lookup module 102 may comprise a lookup table, routing table or other similar lookup protocols that may reference the label or destination address in the incoming electrical data signal to determine routing information. For example, in a MPLS system, the incoming MPLS label may be used as a reference to look up information in the label forwarding information base (LFIB). In some instances, the lookup process may separate the header information from the data portion of the incoming electrical data signal. The header information may comprise a sequence of bits that may dictate the transmission path to a network destination. In particular, the header information may provide the routing or the next hop instructions for subsequent downstream nodes 120 in the optical network 122.

Once the lookup module 102 obtains the header information, the look up wavelength module 104 selects a unique subset of wavelengths "W" from a larger set of available wavelengths "S." The available wavelengths "S" may include all the usable wavelengths for the optical network 122 or the transmitting module 106. Wavelengths in subset "W" may be used to encode the header information bit-by-bit. Furthermore, subset "W" may include wavelengths that have the same wavelength values but have different polarizations.

Dependent on the optical network's ability for polarization control, various polarizations for a given wavelength may constitute different wavelengths for the optical encoding process.

The selection of subset "W" from available wavelengths "S" may be based on a function of the header information "E" (e.g., W=Function (E)). One embodiment of the selection of wavelength Function (E) may be 2*N+V (e.g., Function (E)=2*N+V). The N variable indicates the bit position for the header information "E," while the V variable indicates the bit value for the bit position referenced by N. Applying the 2*N+V function, the encoding process may produce a two-to-one relationship between the subset of wavelengths "W" and the number of bits in the header information "E." For example, the header information may be a 10 bit destination address with bit positions $d_9$-$d_0$ that may be encoded using 20 wavelengths $\lambda_{19}$-$\lambda_0$. Bit $d_0$ may represent bit position zero, while bit $d_1$ may represent bit position one. Bits $d_9$-$d_2$ may follow the same bit position allocation. Two wavelengths may be assigned to each bit position to encoded different data values at the bit position. For bit $d_0$, wavelengths $\lambda_0$ and $\lambda_1$ may be used to encode the "0" and "1" data values, respectively. Applying the two-to-one relationship, $2^{M/2}$ destinations may be encoded, where "M" is the number of selected wavelengths. The number of available wavelengths "S" may be increased by categorizing wavelengths with the same wavelength value but different polarizations as separate wavelengths. Node 100 may be configured to implement other methods or algorithms to assign wavelengths to subset "W." Persons of ordinary skill in the art are aware that there are an abundant number of permutations in selecting a subset "W" from available wavelengths "S" as a function of the header information "E."

Wavelengths in subset "W" with different polarizations may be treated as different encoding wavelengths even though the wavelengths have the same wavelength values. For example, wavelengths $\lambda_0$ and $\lambda_1$ may have the same wavelength value, but wavelength $\lambda_0$ may be polarized in the x-direction, while wavelength $\lambda_1$ may be polarized in the y-direction. As such, wavelengths with the same wavelength values may be used to encode the same bit position $d_0$. Utilization of different polarizations may be implemented using polarization control for the optical network, such as polarization-dependent optical switches.

After the lookup wavelength module 104 selects wavelengths for subset "W," the wavelength information and electrical signal may be sent to the transmitting module 106. The transmitting module 106 may inverse multiplex the incoming electrical data signal over the wavelengths in subset "W." The summation of the wavelengths and polarizations in subset "W" may represent the non-header or data portion of the incoming electrical data signal. Inverse multiplexing the incoming electrical data signal may require segmenting or dividing the incoming electrical data signal. The incoming electrical data signal may be segmented into multiple lower data rate segments. Inverse multiplexing the electrical data signal may be implemented using a variety schemes such as Multi Link Point-to-Point Protocol (PPP), Ethernet's Link Aggregation, or Inverse Multiplexing for ATM (IMA). The segmented portions of the incoming electrical data signal may then be mapped to the wavelengths and polarizations in subset "W."

Additionally, subset "W" may be used to encode the header information. The header information may be encoded bit-by-bit, perhaps including the preamble. Source address data may not need to be encoded using subset "W." Using a laser transmitter, power may be applied to the wavelengths in subset "W" based on the data values in the header information.

For example, the wavelengths $\lambda_{19}$-$\lambda_0$ may be selected to encode a 10 bit destination address "E" $d_9$-$d_0$ that equals a data value of "1000110001." Applying the selection function 2*N+V as the Function (E) embodiment, the transmitting module 106 may apply power to wavelengths $\lambda_1$, $\lambda_2$, $\lambda_4$, $\lambda_6$, $\lambda_9$, $\lambda_{11}$, $\lambda_{12}$, $\lambda_{14}$, $\lambda_{16}$, and $\lambda_{19}$. Other wavelengths in subset "W" $\lambda_0$, $\lambda_3$, $\lambda_5$, $\lambda_7$, $\lambda_8$, $\lambda_{10}$, $\lambda_{13}$, $\lambda_{15}$, $\lambda_{17}$, and $\lambda_{18}$ may have relatively much lower or no power applied. Other embodiments to map and encode the header information may be implemented as long as more power is applied to wavelengths in subset "W" than the entire wavelength set. To ensure signal quality, signal padding may be added to the optical signal 124 prior to the transmission. Afterwards, the optical signal 124 may be transmitted through an optical fiber link 108 in the optical network 122.

Node 110 may receive the optical signal 124 traveling through the optical fiber link 108. Node 110 may functionally comprise an optical splitter 112, FT unit 114, computational logic 116, and a delay module 118. Similar to the node 100, node 110 may comprise a single network device or a plurality of optical network devices, optical-electrical network devices, or any combination thereof to implement node's 110 functions. Node 110 may be configured to provide polarization control and to process a plurality of optical signals 124. As shown in FIG. 1, node 110 may be configured to extract the header information from the optical signal 124 without converting the entire optical signal 124 back into an electrical signal. Identification of the label or destination address may not require synchronization of or identification of bits within the optical packet. Moreover, bit-by-bit reconstruction of the entire optical signal 124 may not be necessary to determine the destination or label, and therefore the subsequent switching action.

Once, node 110 receives optical signal 124, a portion of the optical signal 124 is separated using the optical splitter 112 or a similar device. The optical splitter 112 may be a passive optical component that may comprise an input port with a plurality of output ports. The optical splitter 112 may be configured to separate a plurality of optical segments from the optical signal 124. In FIG. 1, the optical splitter 112 may be configured to have two outputs ports. One output port may be coupled to the FT unit 114 while another output port may be coupled to the delay module 118. The optical splitter 112 may separate an optical segment 125 from the optical signal 124 used to extract the header information and may provide next hop information or routing instructions. The separated optical segment 125 may comprise a relatively small percentage of the optical signal 124 (e.g., 1-10%). The remaining optical signal 126 comprises a majority of the optical signal 124 (e.g., 90-99%) and is outputted to the delay module 118.

The FT unit 114 may perform a spectrum analysis (i.e., FT) on the separated optical segment. FT unit 114 may comprise a plurality of optical, optical-electrical, electrical components, or any combination thereof. The spectrum analysis produces the power spectrum for the separated optical segment. The power spectrum may contain energy peaks that correspond to the wavelengths in subset "W." The energy peaks in the power spectrum data may correspond to the wavelengths that received more power when encoding the optical signal. Existence of energy peaks for each wavelength may depend on the data values in the header. For example, a 10 bit destination address "E" $d_9$-$d_0$ may equal a data value of "1000110001." In this instance, the power spectrum data may have energy peaks at wavelengths $\lambda_1$, $\lambda_2$, $\lambda_4$, $\lambda_6$, $\lambda_9$, $\lambda_{11}$, $\lambda_{12}$, $\lambda_{14}$, $\lambda_{16}$, and $\lambda_{19}$. The FT unit 114 may separate different polarizations prior to performing the spectrum analysis, and thus may produce different power spectrum data for the different polarizations. The FT unit 114 may be coupled to the computational logic 116 and may output the power spectrum data to the computational logic 116. The FT unit 114 may perform the spectrum analysis in the electrical domain or in the optical domain.

The computational logic 116 may be an optical-electrical and/or electrical device configured to process analog or digital signals. More specifically, the computational logic 116 may comprise a plurality of inputs and outputs, power detectors, processors, and any other optical or electrical components capable of processing the power spectrum data. The inputs for the computational logic 116 may be coupled to the FT unit 114 and may be electrical inputs (i.e., inputs configured to receive electrical signals). The computational logic 116 may decode the header information by reverse mapping the power spectrum data from the FT unit 114. The reverse mapping process may determine the data values of the header information by applying the inverse of Function (E) to the power spectrum data (i.e., Function$^{-1}$(power spectrum data)= E). The inverse function of the power spectrum data may map the energy peaks to the data values and bit positions in the header information. By reverse mapping the wavelengths, the header information may be extracted without bit-by-bit reconstruction of the entire optical signal. Moreover, the decoding or reverse mapping process may not require optical and electrical synchronization.

The computational logic 116 may use the decoded header information to provide instructions to downstream nodes 120 to route or switch the remaining optical signal 126 to the next hop or destination node. The computational logic 116 may implement a full lookup, where the entire decoded header information (e.g., destination address or label) is inputted into a single downstream node 120. Partial lookups are discussed in further detail below. Additionally, the header information may program or configure a plurality of downstream nodes 120 necessary to route the remaining optical signal. The downstream nodes 120 may be multiple hops from node 110. The reverse mapping process (i.e., decoding process) and lookup process may be performed in the electrical domain or partially in the electrical domain. Other reverse mapping and look up embodiments may be used to extract the header information encoded in optical signal 124.

The computational logic 116 may output the decoded header information that may comprise a destination address, label information, or any other types of routing instructions to downstream nodes 120. The downstream nodes 120 may be optical or optical-electrical devices configured to receive electrical routing instructions, destination addresses, or labels. The downstream nodes 120 may be a single device or may comprise a plurality of optical, optical-electrical, or electrical devices that may be polarization-dependent. The downstream nodes 120 may comprise a plurality of electrical inputs coupled to the computational logic 116. The downstream nodes 120 may comprise N inputs coupled to the computational logic 116 and M output ports to route the remaining optical signal 126. The downstream nodes 120 outputs the optical signal to an output port depending on the header information received from computational logic 116. Nodes 120 may be part of node 110 (e.g. optical switches within a single device) or downstream nodes in separate devices.

In addition to the electrical inputs coupled to the computational logic 116, the downstream nodes 120 may have optical inputs coupled to other downstream nodes or to the delay module 118. In FIG. 1, downstream node A 120 may receive the remaining optical signal 126 from the delay module 118. Downstream node A 120 may switch or route the remaining optical signal 126 based on the heading information received from the computational logic 116. Downstream node A 120 may output the remaining optical signal 126 to downstream node B 120 or to some other downstream node 120 not shown in FIG. 1. The downstream node A 120 may switch or route the remaining optical signal 126 without performing an optical-to-electrical conversion or decoding the entire remaining optical signal 126 bit-by-bit. Moreover routing of the remaining optical signal 126 may be routed using multiple stages. Each stage may route the remaining optical signal 126 using a unique section of the header information. Multi-stage switching will be discussed more in detail later.

While the header information is decoded using the separated optical segment, the remaining optical signal 126 may be directed to the delay module 118. The delay module 118 may be an optical buffer that provides a fixed delay equivalent to the amount of time necessary to decode the header information and to configure the downstream nodes 120. The fixed delay may also depend on the processing speeds of the various optical, optical-electrical, and electrical components used to decode the header information from the separated optical segment. The delay module 118 may be implemented using a variety of methods, such as recirculating delay lines or cascaded delay lines.

Figure 2:
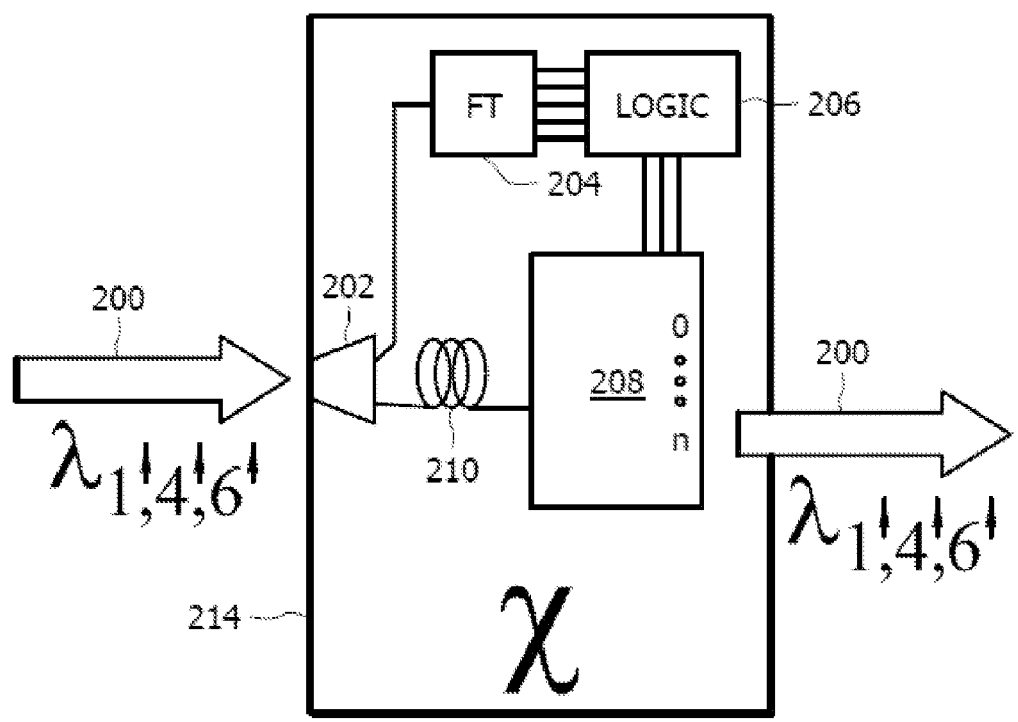
FIG. 2 is a schematic diagram of another embodiment of a node configured to decode and route an optical signal.

FIG. 2 is a schematic diagram of another embodiment of a node 214 that is configured to decode and route an optical signal. Node 214 may be similar to node 110 except node 214 may further comprise a switching module 208 to route the optical signal 200. Node 214 may comprise an optical splitter 202, FT logic unit 204, computational logic 206, and a delay module 210, which are the same as components 112, 114, 116, and 118 as discussed above. The switching module 208 may comprise a plurality of electrical inputs coupled to the computational logic 206 and a plurality of optical inputs coupled to the delay module 210. The routing or switching module 208 may be an optical or optical-electrical component that performs the same function as the downstream nodes 120 in FIG. 1. FIG. 2 illustrates the optical signal 200 may have power or energy peaks for wavelengths 1, 4, and 6. Additionally, node 214 may output an optical signal 200 comprising the same wavelengths as the incoming optical signal 200. Other embodiments of node 214 may alter the wavelengths and polarizations outputted by node 214. For example, the node 214 may need to encode a new label for the optical signal 200, and thus outputs an optical signal 200 comprising wavelengths 2, 5, and 7.

Figure 3:
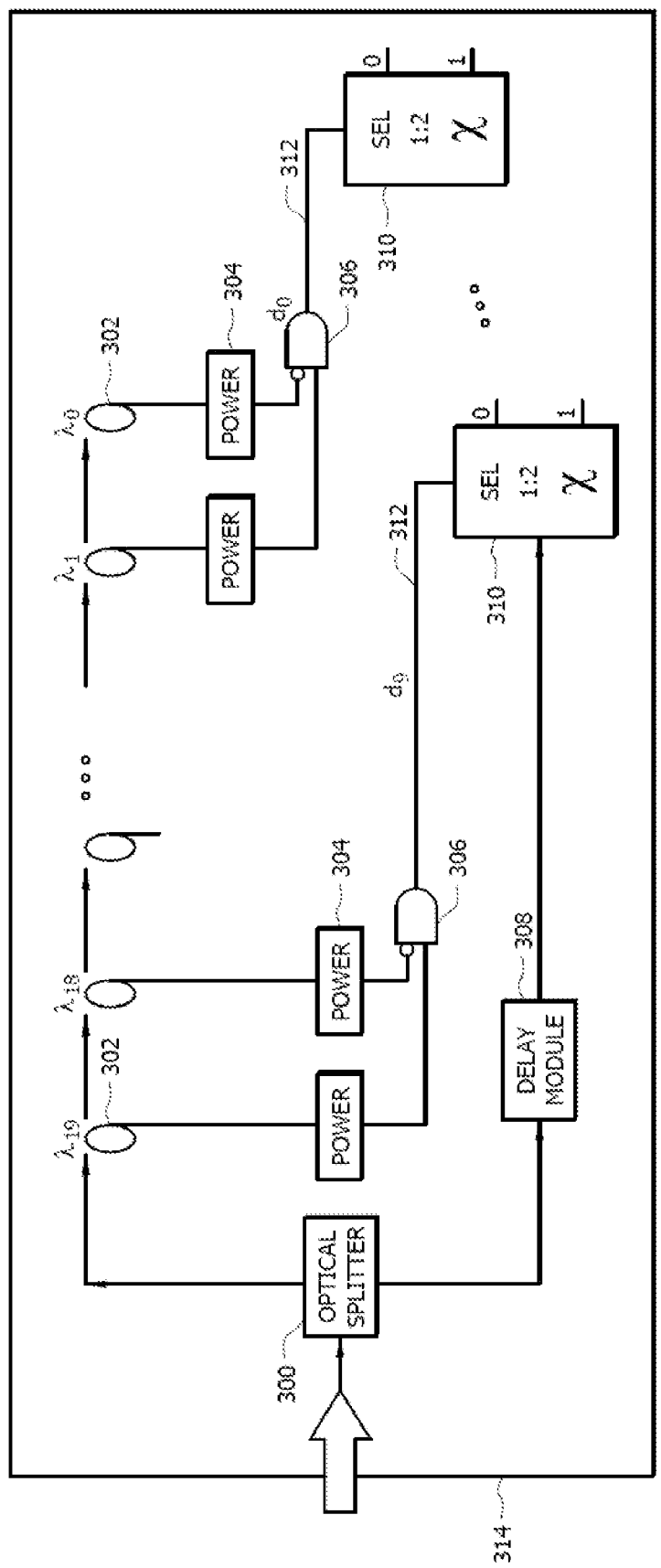
FIG. 3 is a schematic diagram of another embodiment of a node configured to decode the header information encoded in an optical signal.

FIG. 3 is a schematic diagram of another embodiment of a node 314 to decode and route an optical signal. Node 314 is the same as node 214, but uses resonator rings 302 to implement the FT logic unit 204 and comprises a plurality of power detectors 304, a plurality of 1:2 switching devices 310 and computational logic devices 306 that may perform a logical function equivalent to an AND gate with an inverter attached to one of the inputs. The optical splitter 300, and the delay module 308 are the same as the optical splitter 112 and 202. In FIG. 3, the header information may be a 10 bit destination address $d_9$-$d_0$ using 20 available wavelengths $\lambda_{19}$-$\lambda_0$. When a bit position $d_0$ has a data value of zero, bit position $d_0$ may be encoded using wavelengths $\lambda_0$. However, when the same bit position $d_0$ has a data value of one, a second wavelength $\lambda_1$ may be used to encode the bit position $d_0$. The same two-to-one mapping relationship may apply for the remaining bit positions $d_9$-$d_1$ and remaining wavelengths $\lambda_{19}$-$\lambda_2$.

Similar to optical splitter 112 and 202, optical splitter 300 may separate a small fraction of an optical signal (e.g., 1-10%) to decode the header information. Subsequently, the segmented optical signal is forwarded to the resonator rings 302. The resonator rings 302 may be tuned to resonate at a designated wavelength. In FIG. 3, the resonator ring 302 for $\lambda_0$ may be tuned to resonate only at the wavelength value for $\lambda_0$. Other wavelengths may be filtered out and the power spectrum data may not be forwarded to the power evaluator device 304. The resonator rings 302 may also be configured to extract the power spectrum data for the designated wavelength. The power spectrum data may contain energy peaks that correlate with the encoded destination address. For example, if bit position $d_0$ contained a value of zero, then the resonator ring 302 for $\lambda_0$ would produce an energy peak for the $\lambda_0$'s wavelength value, while the resonator ring 302 for $\lambda_1$ would not produce an energy peak. The resonator rings 302 may extract the power spectrum in an analog fashion. Other embodiments may utilize different methods or devices to extract the power spectrum data. The extracted power spectrum data may be analog or digital signals.

Each resonator ring 302 may be coupled to a power evaluator device 304 to determine whether an energy peak exists for a designated wavelength. As stated above, each resonator ring 302 may be tuned for a designated wavelength. The resonator ring 302 inputs the power spectrum data into a power evaluator device 304. The power evaluator device 304 may analyze the power levels and determine whether an energy peak exists in the power spectrum data for the designated wavelength. Based on whether an energy peak exists, the power evaluator device 304 may output a logic signal to the computational logic device 306. The logic signal may be an analog or digital signal and may comprise a single bit or a sequence of bits. Using FIG. 3 as an example, if no energy peak was detected for wavelength $\lambda_0$, the power evaluator device 304 may output a data value of zero. Conversely, if an energy peak was detected for wavelength $\lambda_0$, the power evaluator device 304 may output a data value of one. The power evaluator device may be a power detector or any other similar device capable of measuring power from an optical signal.

The power evaluator device 304 may be coupled to a computational logic device 306 to perform the reverse mapping and look up functions. The computational logic device 306 may use the input received to generate a data value on the destination address data line 312. As shown in FIG. 3, the computational logic device 306 may perform a logical function equivalent to an AND gate with an inverter attached to one of the inputs. The inverter may be attached for inputs that correspond to wavelengths that represent zero data values for the header information. For example, a computational logic device 306 may be configured to process the power evaluator data for wavelength $\lambda_0$ and wavelength $\lambda_1$. Wavelength $\lambda_0$ may represent a zero data value for bit position $d_0$ while wavelength $\lambda_1$ may represent a one data value for bit position $d_0$. As such, an inverter may be attached to the input originating from the power evaluator device 304 that corresponds to wavelength $\lambda_0$. The computational logic device 306 receives the data values from the power evaluator devices 304 and generates a data value for the destination address data line $d_0$ 312. The data value may a single bit or a sequence of bits. The data value may be an analog or digital signal. The destination address data line 312 may then input the data value into the input selector ports for switching devices 310.

In FIG. 3, the switching device 310 may be a 1:2 switching device. A 1:2 switching device routes an optical signal to two possible output ports based on one selection input. The switching device 310 routes the optical signal to output port "0" when the input selector port has a data value of zero. Alternatively, the switching device 310 may switch the optical signal to output port "1" when the input selector port has a data value of one. Although FIG. 3 illustrates utilizing a plurality of 1:2 (i.e., N=1; M=2) switching devices 310, other embodiments may include switching devices 310 with different N and M values (e.g., a 1:M switching device). The routing of the optical signal may be implemented using a plurality of switching devices 310 coupled to each other as shown in FIG. 3. Another embodiment may route the optical signal using a single switching device 310.

Figure 4:
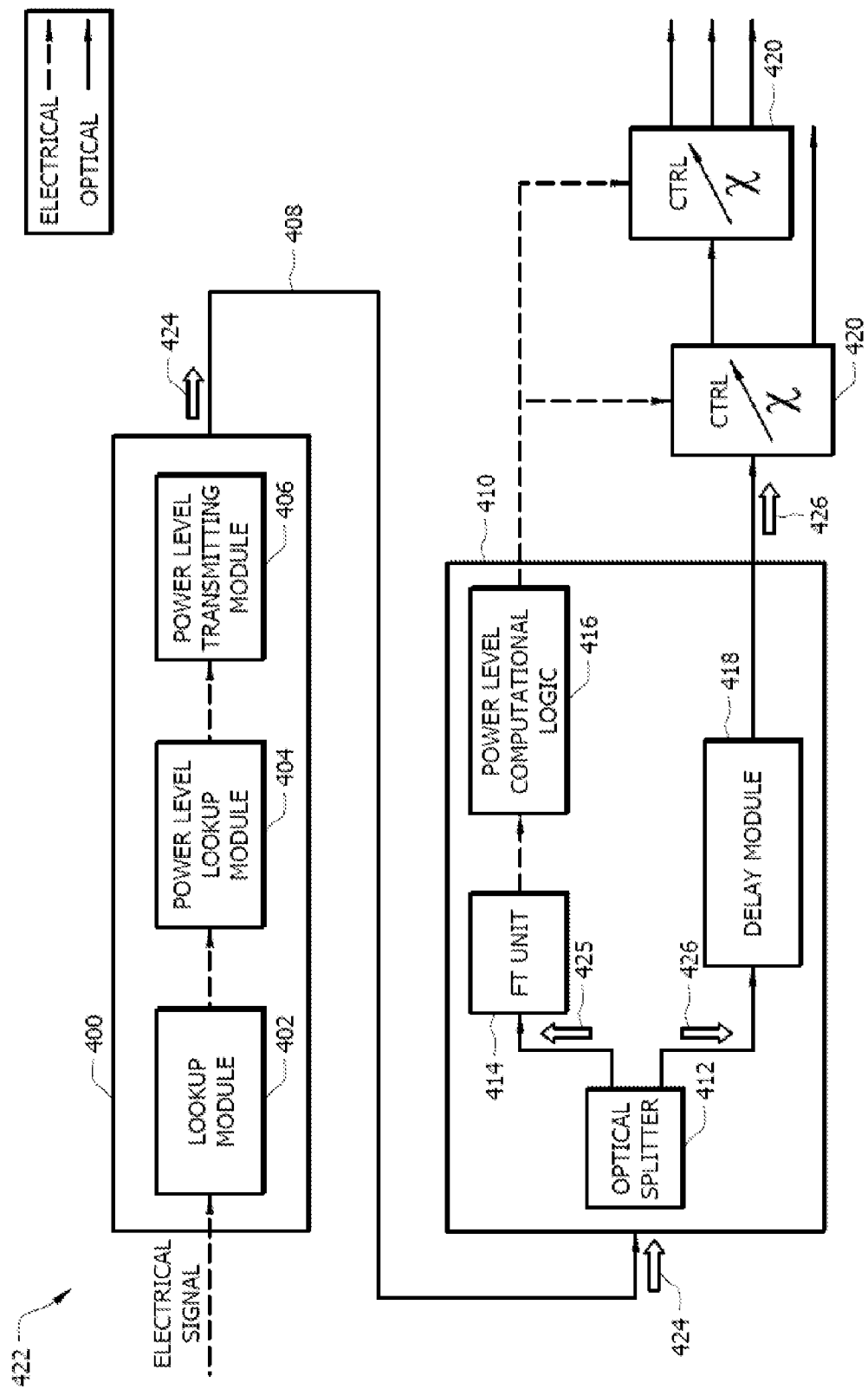
FIG. 4 is a schematic diagram of another embodiment of a framework configured to encode and decode the header information within an optical signal.

FIG. 4 is a schematic diagram of another embodiment of a framework that encodes and decodes the header information within an optical signal. Lookup module 402, optical fibers 408, optical splitter 412, FT unit 414, delay module 418, and downstream nodes 420 are the same as the components 102, 108, 112, 114, 118, and 120 shown in FIG. 1. The power level lookup module 404, power level transmitting module 406, and power level computational logic 416 differ from FIG. 1.

The power level look up module 404 in node 400 selects a unique subset of wavelengths "W" based on wavelength values, polarization, and relative power levels from a larger set of available wavelengths "S." Using relative power levels, a one-to-one relationship may exist between the number of selected wavelengths for subset "W" and the number of bits in the header information. The function or selection algorithm may select wavelengths based on the different wavelength values and relative power levels. For example, the header information may be a 10 bit destination address $d_9$-$d_0$ that may be encoded using 10 wavelengths $\lambda_9$–$\lambda_0$ at a relatively high power level and a relatively low power level. Using the one-to-one relationship, $2^M$ destinations using two relative power levels may be encoded, where "M" is the number of selected wavelengths. Other embodiments may employ selection methods or functions that use more than two relative power levels to encode the header information.

The power level transmitting node 406 may subsequently inverse multiplex the entire incoming electrical data signal, including the header information over the wavelengths in subset "W" to form an optical signal. As stated above, the encoding process may use wavelengths with relative power levels. Relative power levels may be applied to the wavelengths in subset "W" depending on the data values in the contained header information. For example, a destination address $d_9$-$d_0$ that equals "1000110001," wavelengths $\lambda_9$_$X_0$ may be assigned to subset "W" when utilizing two relative power levels. A relatively low power level may indicate a data value of zero and a relatively higher power level may indicate a data value of one. Hence, for bit position $d_0$, wavelength $\lambda_0$ may have a relatively high power level. The summation of the wavelengths in subset "W" may also represent the data encoded in the incoming electrical data signal. Other encoding methods may be used as long as distinguishable relative power levels are used for all wavelengths in subset "W." The optical signal may be padded to ensure energy distribution.

After node 410 receives and splits the optical signal 424 into a separated optical segment 425 and remaining optical segment 426, the FT unit 414 may perform a spectrum analysis to produce a power spectrum using the separated optical segment 425. The power spectrum may include peaks that correspond with members of the subset "W." The relative heights of the peaks provide the relative power levels selected for the different wavelengths. The relative heights for each wavelength may depend on the data values for the header information. Similar to the FT unit 114 in FIG. 1, the FT unit 414 may separate out different polarizations to produce different power spectrum data for wavelengths that have the same wavelength values. Moreover, the FT unit 414 may perform the spectrum analysis in the electrical domain or in the optical domain.

The power level computational logic 416 may then reverse map the power spectrum data received from the FT unit 414. The wavelengths of subset "W" may have a one-to-one mapping function for the header information. By reverse mapping based on the wavelengths, relative power levels, and polarization, the header information may be recreated. The relative power levels may represent the data values for each bit position in the header information. Every bit of the header information, perhaps including the preamble, may be identified using the reverse mapping process without understanding the contents of the optical signal.

Figure 5:
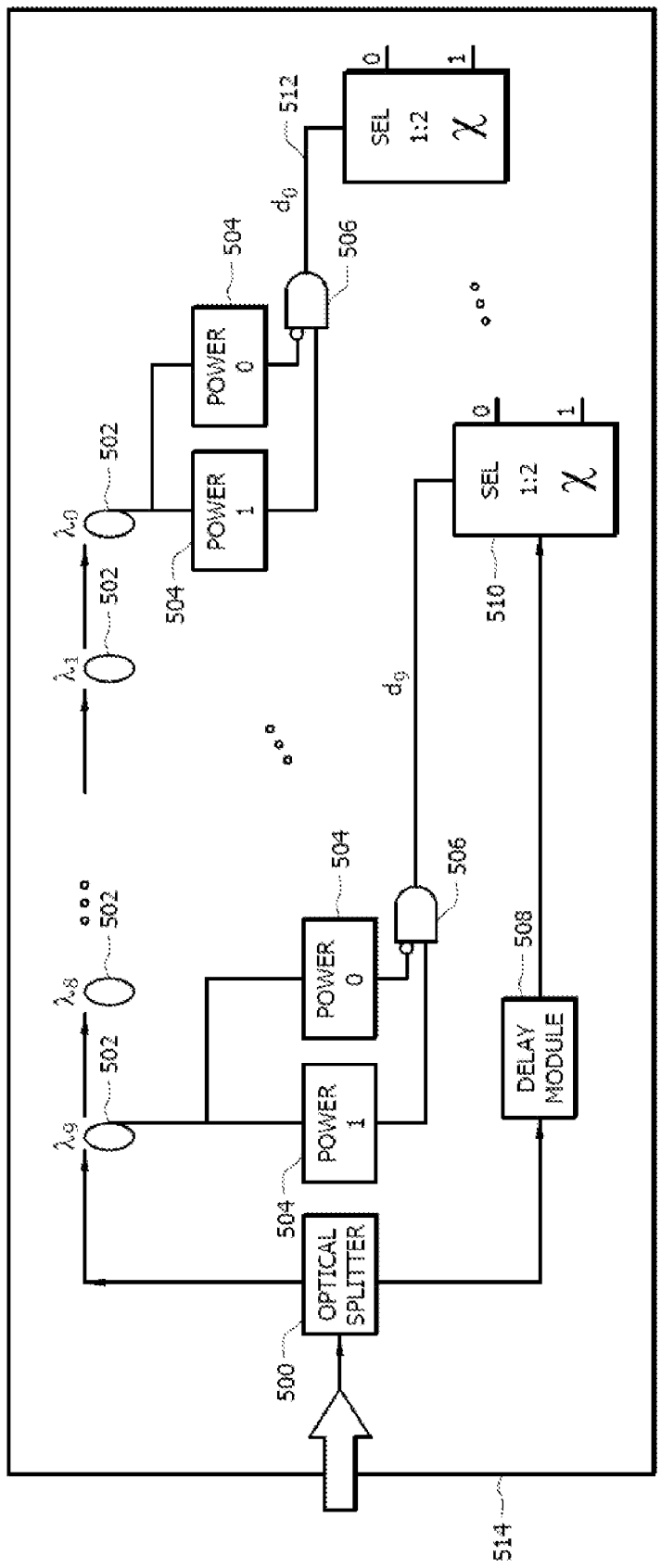
FIG. 5 is a schematic diagram of another embodiment of a node configured to decode the header information encoded in an optical signal.

FIG. 5 is a schematic diagram of another embodiment of a node 514 configured to decode the header information encoded in an optical signal. Node 514 is similar to node 314 except that the header information may be a 10 bit destination address $d_9$-$d_0$ encoded with 10 wavelengths $\lambda_9$_$\lambda_0$. Optical splitter 500, resonator rings 502, computational logic devices 506, delay module 508, switching module 510, and destination address data line 512 are similar to components 300, 302, 306, 308, 310, and 312 shown in FIG. 3. When a bit position $d_0$ has a data value of zero, the bit position may be encoded using one of the wavelengths $\lambda_0$ with a relatively low power level. When the same bit position $d_0$ has a data value of one, wavelength $\lambda_0$ may be encoded with relatively higher power level.

In contrast to FIG. 3, each resonator ring 502 may be coupled to two power evaluator devices 504 to decode the relative power level peaks. The resonator ring outputs the power spectrum data to both power evaluator devices 504. One power evaluator device "Power 0" 504 may evaluate the power spectrum data to determine whether the energy peak equates to a relatively lower power level. A second evaluator device "Power 1" 504 may determine whether the energy peak equates to a relatively higher power level. Thus, both power evaluators "Power 0," "Power 1" 504 may output the data values that are dependent on relative power levels for a given wavelength. Using FIG. 5 as an example, if a relatively low power level was applied to wavelength $\lambda_0$ during the encoding process, the power evaluator device 504 "Power 0" may output a signal with data value of one. Conversely, the power evaluator device 504 "Power 1" would output a signal with data value of zero. The data values may be analog or digital signals.

Figure 6:
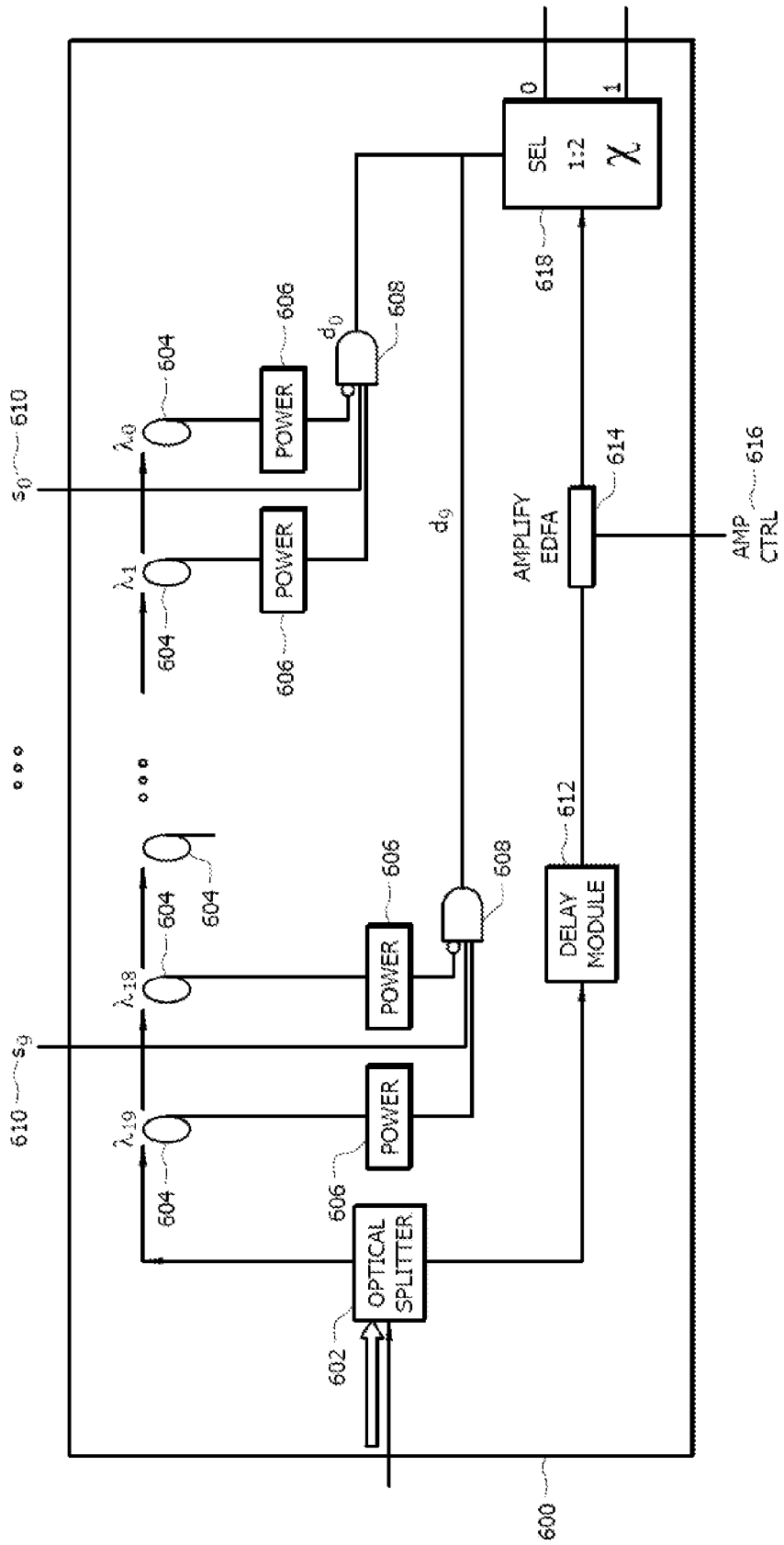
FIG. 6 is a schematic diagram of an embodiment of a network component used for multi-stage switching.

FIG. 6 is a schematic diagram of an embodiment of a network component 600 used for multi-stage switching. The network component 600 comprises an optical splitter component 602, resonator ring components 604, power evaluator components 606, an optical buffer component 612, and a switching component 618 that are the same as components 300, 302, 304, 308, and 310 shown in FIG. 3. The network component 600 further comprises different computational logic components 608, wavelength selection inputs 610, an amplifier 614, and an amplifier control input 616.

The optical buffer 612 delays and forwards an optical signal to an optical amplifier component 614. The optical amplifier component 614 may be used to regenerate or amplify the optical signal. The optical amplifier component 614 may be an optical device or an optical-electrical device. Examples of optical amplifier components 614 may be Erbium-doped fiber amplifier (EDFA), other semiconductor optical amplifier, or a regenerator that requires conversion to the electrical domain. An amplifier control input 616 may be provided by an external or internal source.

Similar to computational logic devices 306 shown in FIG. 3, the computational logic component 608 receives the data values from the power evaluator devices 606. However, the computational logic component 608 may have three input ports and one output port. Two different power evaluator components 606 may provide the input signal for two of the input ports. The third input port may be for the wavelength selection input 610. The computational logic component 608 may perform a logical function equivalent to an AND gate with an inverter attached to one of the inputs. The wavelength selection input 610 may be supplied by an external or internal source.

An external source may provide data for the wavelength selection inputs 610 to control the wavelengths used in the switching operation. FIG. 6 illustrates data for the wavelength selection inputs $S_9$-$S_0$ 610 may be provided through parallel communication. Another embodiment may have the network component 600 to process the wavelength selection inputs $S_9$-$S_0$ serially. Wavelength selection input 610 selects a subset of the wavelengths in the separated optical segment to route the remaining optical signal. For example, when wavelength selection input 610 $S_9$ has a logical value of 1, and $S_8$_$S_0$ have a data value of zero, wavelengths $\lambda_{18}$ and $\lambda_{19}$ or destination address $d_9$ may affect the switching component 618. Other destination address bits $d_8$-$d_0$ may not have been selected, and thus may not affect the switching component 618. In this instance, wavelengths $\lambda_{18}$ and $\lambda_{19}$ or destination address $d_9$ may configure the switching component to route the remaining optical signal to a particular output.

Another embodiment may have the power evaluator component 606 and computational logic devices 608 configured to detect relative power levels or relative heights in the energy peaks as shown in FIG. 5. The inverter may be attached for inputs that correspond to wavelengths that represent zero data values for the header information. The embodiment may have the inverter attached to the "Power 0" power evaluator component 606 when the encoding process involves using relative power levels. Dependent on the input values, the computational logic component 608 processes the inputted values and outputs a resulting value to the switching component 618. The resulting value may be a single bit or a sequence of bits.

Figure 7:
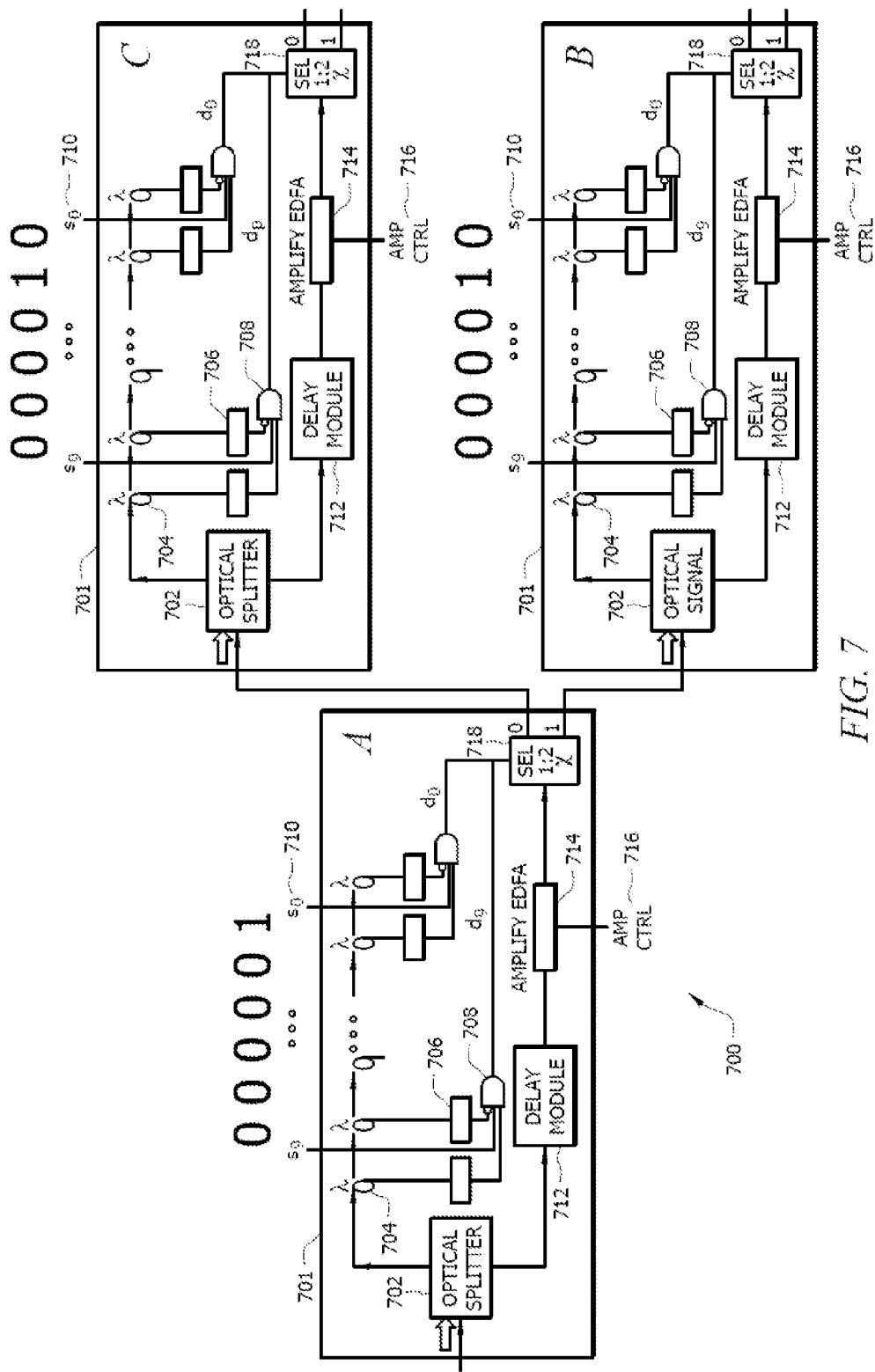
FIG. 7 is a schematic diagram of an embodiment of a multi-stage component comprising a plurality of common network components.

FIG. 7 is a schematic diagram of an embodiment of a multi-stage component 700 comprising a plurality of common network components 701. The multi-stage component 700 may comprise common network components 701 coupled together to route an optical signal based on the encoded header information. FIG. 7 illustrates network component A 701 coupled to network components B and C 701. In other embodiments, network component A 701 may be coupled to more than two common network components 701. Moreover, network components' B and C 701 output ports may be coupled to additional common network components 701 to form additional stages of the optical routing process. Each common network component 701 may comprise an optical splitter component 702, resonator ring components 704, power evaluator components 706, computational logic components 708, wavelength selection inputs 710, a delay module 712, an amplifier component 714, an amplifier control input 716, and a switching component 718 that are the same as to the components 602, 604, 606, 608, 610, 612, 614, 616, and 618 as discussed above.

In FIG. 7, common network component 701 A may be configured to route an incoming signal based on the $d_0$ bit in the header information. The $S_0$ wavelength selection input 710 may be assigned a data value of one while $S_9$-$S_1$ may have a data value of zero. The value of $d_0$ determines whether the optical signal is routed to network component B 701 or network component C 701. For example, if $d_0$ had a data value of one, the optical signal may be routed to network component B 701. However, if $d_0$ had a data value of zero, the optical signal may be routed to network component C 701. Network component B and C 701 may have a data value of one for $S_1$ wavelength selection input 710. Other wavelength selection inputs $S_9$-$S_2$, $S_0$ 710 may have a data value of zero. As a result, network component B and C 701 may route any optical signal based on the value of $d_1$. Additional common network components 701 may be coupled to form stages necessary to evaluate the remaining destination bits $d_9$-$d_2$. The multi-stage component 700 may be constructed such that the additional common network components 701 for each stage may be coupled in the same manner as how network components B and C 701 are coupled to network component A 701. The common network components 701 forming the multi-stage component 700 may be coupled such that common network components 701 may be situated in one location of the optical network or in different locations of the optical network.

Figure 8:
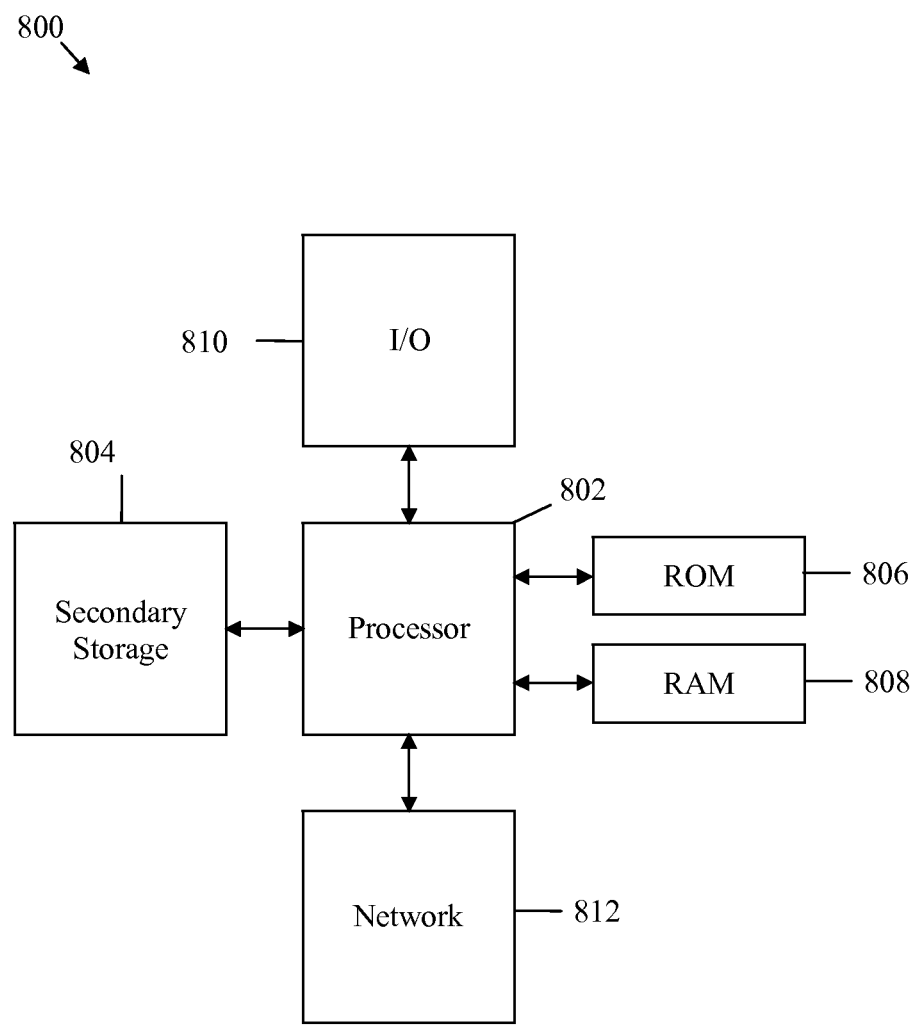
FIG. 8 is a schematic diagram of an embodiment of a general-purpose computer system.

The network components and devices described above may be implemented on any general-purpose network component, such as a computer or network component with sufficient processing power, memory resources, and network throughput capability to handle the necessary workload placed upon it. FIG. 8 illustrates a typical, general-purpose network component 800 that may correspond to or may be part of a network component, such as a server, a switch, a router, or any other network nodes. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The general-purpose network component 800 may also comprise, at the processor 802 and or any of the other components of the general-purpose network component 800.

The processor 802 may be implemented as one or more CPU chips, or may be part of one or more application specific integrated circuits (ASICs) and/or digital signal processors (DSPs). The processor 802 may comprise a central processor unit or CPU. The processor may be implemented as one or more CPU chips. The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, optical or otherwise. Other examples of changes, substitutions, and alterations are ascertainable by one skilled in the art and could be made without departing from the spirit and scope disclosed herein.

What is claimed is:

1. An apparatus comprising:
   an integrated circuit;
   a processor on the integrated circuit, wherein the processor is configured to:
      split an optical signal into a first optical signal and a second optical signal, wherein the first optical signal comprises a plurality of encoded wavelengths;
      receive a selection signal, wherein the selection signal selects a plurality of active wavelengths, wherein the active wavelengths are a subset of the encoded wavelengths;
      compute the routing information for the second optical signal using the active wavelengths; and
      switch the second optical signal using the routing information to a downstream component, wherein the optical signal includes sequential packets.

2. The apparatus of claim 1, wherein the processor is further configured to perform a spectrum analysis on the first optical signal to obtain the power spectrum data for the encoded wavelengths and compute the routing information for the second optical signal using the power spectrum data for the active wavelengths.

3. The apparatus of claim 2, wherein the power spectrum data comprises a plurality of energy peaks, wherein some of the energy peaks represent the active wavelengths, and wherein instructions further cause the processor to compute the routing information using the energy peaks that represent the active wavelengths.

4. The apparatus of claim 3, wherein the energy peaks comprise a plurality of relative heights, and wherein the instructions further cause the processor to compute the routing information using the relative heights for the active wavelengths.

5. The apparatus of claim 1, wherein the processor is further configured to amplify the second optical signal prior to switching the second optical signal.

6. The apparatus of claim 1, wherein the first optical signal comprises a destination address header, and wherein the active wavelengths encode a portion of the destination address header.

7. The apparatus of claim 6, wherein the processor is further configured to compute the routing information using the portion of the destination address header.

8. The apparatus of claim 1, wherein the apparatus comprises a plurality of output ports, and wherein instructions further cause the processor to switch the second optical signal to one of the output ports using the routing information.

9. The apparatus of claim 1, wherein the selection signal selects a first encoded wavelength and a second encoded wavelength as the active wavelengths.

10. An apparatus comprising:
    a first single-stage component comprising a first output port and a second output port;
    a second single-stage component coupled to the first output port; and
    a third single-stage component coupled to the second output port,
    wherein the first single-stage component is configured to:
       receive an optical signal comprising a plurality of encoded wavelengths;
       receive a first selection message from a selection logic unit; and
       switch the optical signal to one of the output ports using the encoded wavelengths and the first selection message, wherein consecutive packets within the optical signal may be switched to a same one of the output ports, and
    wherein the selection logic unit is configured to transmit a second selection message to the second single-stage component and to the third single-stage component, and
    wherein the first selection message selects a subset of the encoded wavelengths, and wherein the subset of the encoded wavelengths switches the optical signal.

11. The apparatus of claim 10, wherein the selection logic unit is external to the apparatus.

12. The apparatus of claim 10, wherein the first selection message and the second selection message are a sequence of bits, and wherein data values for the first select message and the second selection message are different.

13. The apparatus of claim 10, wherein the first bit position of the first selection message has a one data value, and wherein the second bit position of the first selection message has a zero data value.

14. The apparatus of claim 10, wherein the first bit position of the second selection message has a zero data value, and wherein the second bit position of the second selection message has a one data value.

15. The apparatus of claim 10, wherein the second single-stage component is configured to receive a routed optical signal from the first single-stage component and switch the optical signal using the second selection message.

16. The apparatus of claim 15, wherein the third single-stage component is configured to receive a routed optical signal from the first single-stage component and switch the optical signal using the second selection message.

17. An apparatus comprising:
    a first single-stage component comprising a first output port and a second output port;
    a second single-stage component coupled to the first output port; and
    a third single-stage component coupled to the second output port,
    wherein the first single-stage component is configured to:
       receive an optical signal comprising a plurality of encoded wavelengths;
       receive a first selection message from a selection logic unit; and
       switch the optical signal to one of the output ports using the encoded wavelengths and the first selection message, wherein consecutive packets within the optical signal may be switched to a same one of the output ports, and
    wherein the selection logic unit is configured to transmit a second selection message to the second single-stage component and to the third single-stage component, and
    wherein the optical signal comprises a destination address header, wherein the first selection message selects a portion of the destination address header, and wherein the portion determines the output port to switch the optical signal.

18. A method comprising:
    decoding a destination address encoded in an optical signal to a sequence of bits using spectrum analysis;
    partition the destination address into a plurality of segments, wherein each segment comprises one data value for a bit position in the destination address, wherein each segment has data values for different bit positions in the destination address;
    selecting a first segment;
    routing the optical signal in an optical network using the first segment;

selecting a second segment; and routing the optical signal using the second segment after the optical signal has been routed using the first segment.

19. The method of claim 18, wherein the first segment comprises a data value for the first bit position in the destination address, and wherein the second segment comprises a data value for the second position in the destination address.

\* \* \* \* \*